United States Patent
Zaltsman et al.

(10) Patent No.: US 9,112,761 B1
(45) Date of Patent: Aug. 18, 2015

(54) SYSTEM AND METHOD FOR ROUTING AND UP-CONVERTING NARROWBAND CHANNELS

(71) Applicant: Harmonic, Inc, San Jose, CA (US)

(72) Inventors: Ariel Zaltsman, Raanana (IL); Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 14/179,599

(22) Filed: Feb. 13, 2014

(51) Int. Cl.
*H04K 1/02* (2006.01)
*H04L 27/36* (2006.01)
*H04L 5/06* (2006.01)
*H04B 1/403* (2015.01)

(52) U.S. Cl.
CPC .............. *H04L 27/366* (2013.01); *H04L 5/06* (2013.01); *H04B 1/406* (2013.01)

(58) Field of Classification Search
None
See application file for complete search history.

(56) References Cited

U.S. PATENT DOCUMENTS

| | | | |
|---|---|---|---|
| 7,010,225 B1 * | 3/2006 | Dasylva et al. | 398/45 |
| 2002/0024993 A1 * | 2/2002 | Subramanian et al. | 375/216 |
| 2004/0142696 A1 | 7/2004 | Saunders et al. | |
| 2008/0240275 A1 | 10/2008 | Cai | |
| 2008/0316912 A1 | 12/2008 | Al Adnani | |
| 2009/0046790 A1 | 2/2009 | Soliman | |
| 2010/0109928 A1 | 5/2010 | Chen | |
| 2010/0232395 A1 | 9/2010 | McLeod et al. | |
| 2011/0211541 A1 | 9/2011 | Yuk et al. | |
| 2012/0120911 A1 | 5/2012 | Miyoshi et al. | |
| 2013/0034189 A1 | 2/2013 | Ye | |
| 2014/0169501 A1 | 6/2014 | Nazarathy et al. | |

* cited by examiner

*Primary Examiner* — Leon-Viet Nguyen
(74) *Attorney, Agent, or Firm* — Brokaw Patent Law PC; Christopher J. Brokaw

(57) ABSTRACT

A device that may include a router and may also include narrowband generators arranged to generate samples of narrowband channels, a digital up converter (DUC). The DUC may include multiple DUC inputs. Different DUC inputs are associated with different frequency ranges. The router may include multiple router inputs, multiple router outputs and a routing circuit. The multiple router outputs are coupled to the multiple DUC inputs. The multiple router inputs are coupled to the narrowband generators. The routing circuit may include a re-sequencing memory module that is arranged to receive the samples of narrowband channels from the narrowband generator according to an input order and to output the samples of the narrowband channels to the multiple router outputs according to an output order that is responsive to an allocation of frequencies to the samples of the narrowband channels.

15 Claims, 5 Drawing Sheets

SYSTEM AND METHOD FOR ROUTING AND UP-CONVERTING NARROWBAND CHANNELS

BACKGROUND OF THE INVENTION

Digital up converters receive multiple narrowband channels such as but not limited to quadrature amplitude (QAM) and multiplex them in order to provide a single wideband channel.

There is a growing need for an agile system that is capable of efficiently up-converting each narrowband channel to each frequency slot within a wideband output frequency range.

SUMMARY

A device is provided for providing narrowband channel samples.

A device may include a router; wherein the router comprises multiple router inputs, multiple router outputs and a routing circuit coupled between the multiple router inputs and the multiple router outputs; wherein the multiple router outputs are coupled to multiple digital up converter (DUC) inputs; wherein the different DUC inputs are associated with different frequency ranges; wherein the multiple router inputs are coupled to multiple narrowband generators; wherein the narrowband generators are arranged to generate samples of narrowband channels; and wherein the routing circuit may include a re-sequencing memory module that may be arranged to receive the samples of narrowband channels from the narrowband generator according to an input order and to output the samples of the narrowband channels to the multiple router outputs according to an output order that is responsive to an allocation of frequencies to the samples of the narrowband channels.

The device may include the DUC.

The device may include the narrowband generators.

The order of provision of samples of narrowband samples to each DUC input of the multiple DUC inputs may determine an allocation of frequencies by the DUC to the samples of the narrowband channels within a frequency range associated with the DUT input.

The re-sequence memory module may be coupled in parallel to all the multiple router inputs thereby facilitating a concurrent provision of samples of the narrowband channels to the multiple router inputs.

The multiple DUC inputs may include a first number (J) of DUC inputs; and wherein the re-sequencing memory module may include a first number (J) of memory sub-modules, each memory sub-module may include a dual-port memory module.

The multiple DUC inputs may include a first number (J) of DUC inputs; wherein each router output is coupled to a first multiplexer output; wherein each first multiplexer has a second number (M) of first multiplexer inputs; wherein each first multiplexer input is coupled to a re-sequencing memory module.

Each narrowband generator may be arranged to output an input time division multiplex of samples of different narrowband channels; and wherein each DUC input may be arranged to receive an output time division multiplex of samples.

The narrowband generators may be quadrature amplitude modulation (QAM) modulators.

The multiple narrowband generators may include a plurality (M) of narrowband generators, each may be arranged to output multiple (N) narrow band channels, wherein the DUC may include multiple (J) inputs, wherein the re-sequence memory module may include M groups of J re-sequencing units, wherein each narrowband generator is coupled in parallel to J re-sequencing units, wherein one re-sequencing unit from each of the M groups of the J re-sequencing units are coupled to multiple inputs of one multiplexer out of J multiplexers, wherein J outputs of the J multiplexers are coupled to the J inputs of the DUC.

Each narrowband generator may be arranged to output samples of the N narrowband channels in a time division multiplexing (TDM) manner.

The device may include a read/write circuit that may be arranged to send control signals that determine the mapping between narrowband samples and sub-bands to the M groups of J re-sequencing units and to the J multiplexers.

The multiple narrowband generators may include a plurality (M) of narrowband generators, each may be arranged to output multiple (N) narrow band channels, wherein the DUC may include multiple (J) inputs, wherein the re-sequence memory module may include J re-sequencing units, wherein each narrowband generator is coupled in parallel to each one of the J re-sequencing units, wherein each of the J re-sequencing units is coupled to a unique input of the DUC.

Each narrowband generator may be arranged to output samples of the N narrowband channels in a time division multiplexing (TDM) manner.

The device may include a read/write circuit that may be arranged to send control signals that determine the mapping between narrowband samples and sub-bands to the J re-sequencing units and to the J multiplexers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
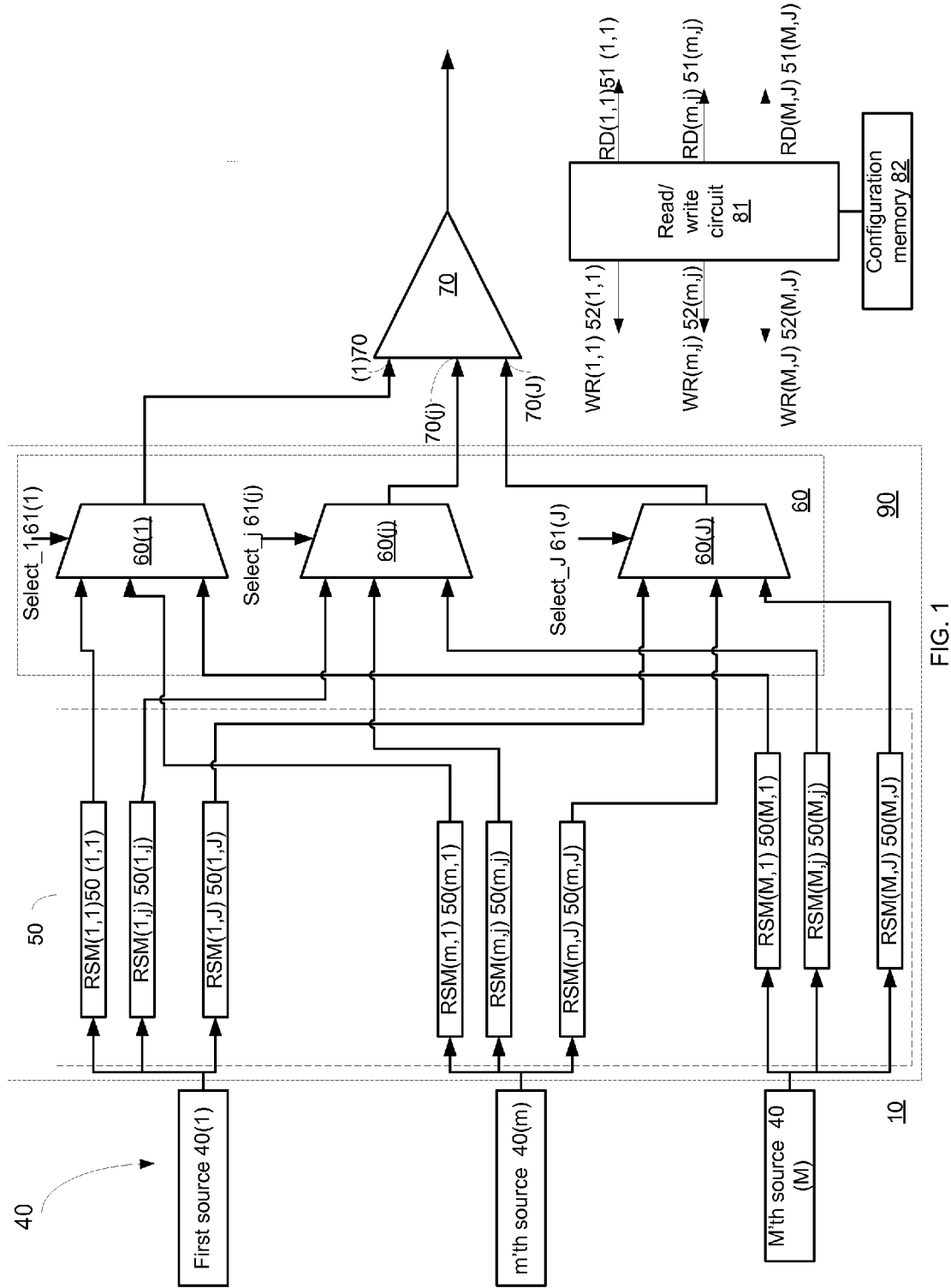
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Narrowband channels are channels that are less than 20 megahertz wide. For simplicity of explanation it is assumed that the narrowband channels are quadrature amplitude modulated (QAM) channels but other narrowband channels can be routed and up-converted by the method and system illustrated below.

There is provided a system that may include narrowband generators (also referred to as sources) or QAM generators, a router and a Digital Up Converter (DUC).

The router is arranged to position each QAM channel into its designated frequency. The router allows frequency allocation change of any QAM channel without disturbing any 'other' channels, meaning smooth and fully agile change.

According to one embodiment the system operates in a Time Division Multiplexing (TDM) with a sequential processing manner. Each QAM channel is made of a low sampling rate stream. Modules in the system operate at a higher frequency, thus processing N channels sequentially using same hardware resource. Each QAM generator produces N QAM channels. For example, N may be equal sixteen or other numbers.

The TDM streams from the different QAM generators enter the router, the router also operates in a TDM fashion and output is also sequentially TDM.

The output of the router is channel samples in a TDM fashion. The DUC may also operate in TDM.

The DUC maps the $1^{st}$ DUC input port to lower sub-bands frequencies, and so on until the $J^{th}$ last DUC input port which is mapped to higher sub-band frequencies. Other mapping may be provided.

The time (TDM) order of the channels entering the DUC is meaningful. The $1^{st}$ TDM channel entering the $1^{st}$ DUC port is mapped to the lowest sub-band. The $2^{nd}$ TDM channel entering the $1^{st}$ DUC port is mapped to the $2^{nd}$ lowest or following sub-band, and so on. In one embodiment the DUC maps 192 sub-bands, where sub-bands are spaced 5 Mhz apart. The mentioned above relationship is just an example. Other relationships between the time (order) of arrival of a QAM channel sample to a DUC input of the DUC and the allocation of sub-bands out of a range of sub-bands allocated to that DUC input can be implemented.

FIG. 1 illustrates a system 10 according to an embodiment of the invention. The system includes M sources 40(1)-40(M) of narrowband channels, a router 90 and a DUC 70. The DUC has J inputs 70(1)-70(J), each input is associated with a range of sub-bands. The router 90 includes a routing circuit that includes (a) M*J re-sequencing memories RSM(1,1)-RSM(M,J) 50(1,1)-50(J,M) that form a re-sequencing memory module 50, and (b) J multiplexers 60(1)-60(J) that form multiplexing module 60, each multiplexer has M inputs that are coupled to M re-sequencing memories that are coupled to each one of the M sources, and to a single DUC input. It is noted that the J multiplexers may be replaces by multiple levels of multiplexers that are coupled to each other. For example there may be provided two layers of multiplexers that include first and second multiplexers. Each first multiplexer input is coupled to a second multiplexer output; wherein multiple second multiplexers are coupled in parallel to the narrowband generators.

FIG. 1 illustrates RSM(1,1) 50(1,1), RSM(1,*j*) 50(1,*j*), RSM(,J) 50(1,J), RSM(m,1) 50(*m*,1), RSM(m,*j*) 50(*m*,*j*), RSM(m,J) 50(*m*,J), RSM(M,1) 50(M,1), RSM(M,j) 50(M,j), and RSM(M,J) 50(M,J). In FIG. 1 index j is shown as being between 1 and J and index m is shown as being between 1 and M. It is noted that index j may equal 1 or J and index m may equal 1 or M.

In general, for index j ranging between 1 and J and for index m ranging between 1 and M, the j'th multiplexer 60(*j*) has a. An output that is coupled to the j'th DUC input 70(*j*).
b. M inputs that are coupled to j'th RSM of each group of J RSMs—for example RSM(1,*j*), RSM(m,j) and RSM (M,j).
c. A j'th control input for receiving a selection signal select 61_j 61(*j*) for selecting one input of the multiplexer at a time.

The re-sequencing memory module 50 is arranged to receive the samples of narrowband channels from the narrowband generators according to an input order and to output the samples of the narrowband channels to the multiple router outputs according to an output order that is responsive to an allocation of frequencies to the samples of the narrowband channels. The input and output orders can be determine by read and write control signals such as RD(1,1) 51(1,1), RD(m,j) 51(*m*,*j*) and RD(M,J) 51(M,J) and WR(1,1) 52(1,1), WR(m,j) 52(*m*,*j*) and WR(M,J) 52(M,J) all generated by read/write circuitry 81 that may be configured (the order or read and write determined) by programming a configuration memory 82.

Each re-sequencing memory can be a dual port RAM that can be written according to a first order (determined by RD(m,j) 51(*m*,*j*)) and can be read according to another order (Determined by WR(m,j)).

Assume N (TDM factor)=16. Assume 80×QAM channels, meaning M=80/16=5.

Assume 192 sub-bands (frequency bins) at 16 channels TDM. Up to 16 QAM channels are scheduled into each DUC input. J=192/16=12.

All 80 generated QAM channels (generated by sources 40) should be accessible to each of the J DUC inputs independently, and to each TDM slot within.

During 16 TDM phases, 5 re-sequence memories RDM(1, *j*), RDM(2,*j*), RDM(3,*j*), RDM(4,*j*) and RDM(5,*j*) receive all QAM samples directed to DUC input j 70(*j*). In one embodiment RDM write address is a straight counter but the read sequence makes sure that each of the QAM samples directed to DUC input 70(*j*) is realigned to its designated TDM phase. Spreading the QAM channels that used the same TDM phase at the Router input into individual phases).

Multiplexer 60(*j*) assures that during each of the 16 TDM phases the correct re-sequence RDM (out of RDM(1,*j*), RDM (2,*j*), RDM(3,*j*), RDM(4,*j*) and RDM(5,*j*)) is connected to j'th input 70(*j*) of DUC 70.

In another embodiment the write sequence is done out-of-order, according to the re-sequencing requirements, and the read address is a straight counter.

According to an embodiment of the invention the multiplexers may elect between one out of M inputs and between a coefficients such as zero. When M=5, select_j 61(*j*) may elect between the five inputs of multiplexer 60(*j*) and a coefficient such as zero. For example, a $6^{th}$ value of select_j may be used to pass 0 to j'th input 70(*j*) of DUC if no actual QAM sample is assigned to a certain channel position.

Yet for another example first source 40(1) output includes samples of QAM channels {ch1, ch2, ..., ch16} in TDM fashion. Router 90 should map 'ch14' into sub-band 19, meaning providing that sample to the second input 70(2) of DUC input 2 at the third time slot (TDM 3).

During TDM_count=14, of the embodiment in which RDM write address is a straight counter, the 'ch14' sample is written to address=14 in all J RSMs connected to source 40(1)-RSM(1,1), RSM(1,2), RSM(1,3), RSM(1,4) and RSM (1,5). During TDM_count=3 all the RAMs connected to DUC input 2 70(2), RAM{ m,j=2}, where m=1 to M, are being read from address 14. During TDM_count=3, MUX_J=2 selects one of the 5 RAM outputs connected to it, which should be RAM{m=1,[j=2] }.

The configuration memory 82 stores control words that should be fed to the router 90 in order to provide a predetermined mapping between QAM channels and frequencies.

Figure 2:
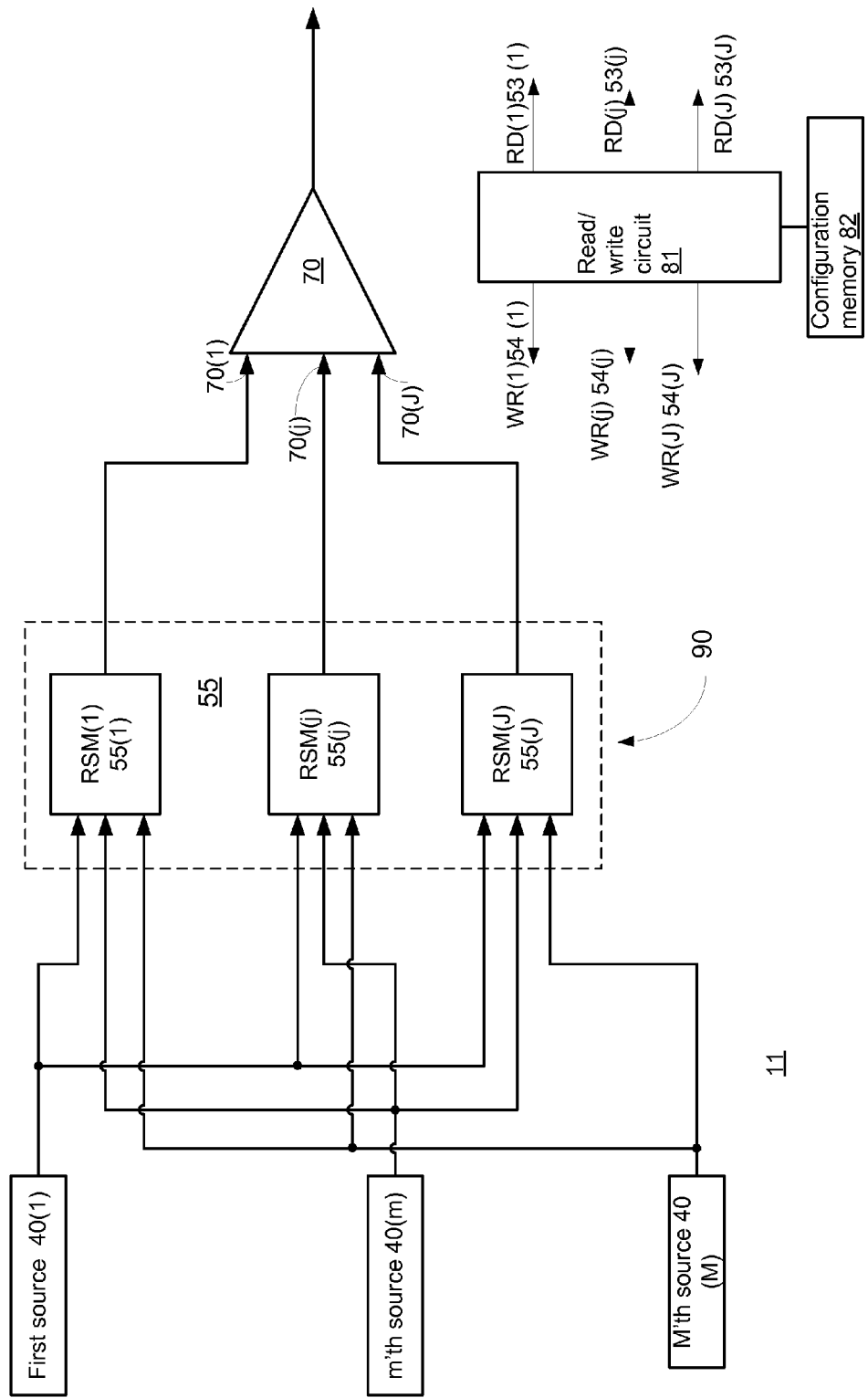
FIG. 2 illustrates a system according to an embodiment of the invention.

FIG. 2 illustrates system 11 according to an embodiment of the invention.

The system includes M sources 40(1)-40(M) of narrow-band channels, a router 90 and a DUC 70. The DUC has J inputs 70(1)-70(J), each input is associated with a range of sub-bands. The router 90 includes a routing circuit that includes M re-sequencing memories RSM(1)-RSM(J) 55(1)-55(J) that form a re-sequencing memory module 55. Each RSM is connected to each one of M sources 40(1)-40(M) and to single input of DUC 70. The j'th RSM (RSM(j)) is connected to the j'th input (70(*j*)) of DUC 70.

RSM(1)-RSM(J) 55(1)-55(J) may be a RAM of dual port dual size, which is an embedded feature of most todays FPGA devices (e.g. Stratix from Altera and Virtex from Xilinx). For example Altera™ FPGA series RAM blocks natively support 'simple dual-port mode' with option to supports different read and write data widths named "mixed-width support".

Using Dual-Size RAM addressing, the multiplexer functionality (of multiplexers 60 of FIG. 1) is translated to an organized addressing in to and out from the dual-sized RAM.

RAM(1)-RSM(J) 50(1)-50(J) can be read and written in a read order and write order that can be determined by read and write control words such as RD(1)-RD(J) 53(1)-53(J) and WR(1)-WR(J) 54(1)-54(J). All said control words are generated by read/write circuitry 81 that may be configured (the order or read and write determined) by programming a configuration memory 82.

Assuming N(TDM factor)=16. For an eighty QAM channel case M=5.

Assume 192 sub-bands (frequency bins) at 16 channels TDM. Up to 16 QAM channels are scheduled into each DUC input. J=192/16=12.

All eighty generated QAM channels should be accessible to each of the J DUC inputs independently, and to each TDM slot within. This is done through J sets of re-sequence RSMs.

In this example, the RSM size from write access is 16×8× WL and the RSM size from read access is 128×1×WL. This will be explained later on. WL is the sample WordLength, e.g. 32 bits per sample.

In one embodiment re-sequence RSM(j) write address is a straight counter. The read sequence function is two folded: (1) selects which of the QAM processor groups to be directed to the j'th input of DUC (denoted DUC(j)), (2) makes sure that each of the QAMs directed to DUC(j) is realigned to its designated TDM phase. Therefore, the out-of-order read should select one of the M×N channels, selecting an explicit channel among all the M×N channels in the system. In this example M×N=5*16=80 channels. The read operation can select a memory location known to hold a coefficient such as 0, to pass to the DUC if no actual QAM sample is assigned to a certain channel position.

Read address word size is ceiling($\log_2$(M×N))=7 bits in this example. Therefore, the configuration word size for each RSM(j) is 7 bits. The configuration word is cycling along the TDM 16.

The overall configuration (command) word size sent to the router core for all the J RSMs is: J*7=12*7=84 bits. The command is changed in a TDM fashion, consequently the total number of bits for storing the entire N=16 commands is 82*N=1344 bits.

The router configuration information (stored in a configuration memory) may include 160 control words, each controls one DUC entry (one sub-band). Each DUC entry control word describes the QAM channel number that should be routed to that entry. The QAM channel number is described as follows: the MSB represent the QAM group index into the Router core, and the LSB represent the QAM index within that group.

In another embodiment, the re-sequence RSMs can also serve as clock domain transfer FIFO. In such a case 4 or 8 TDM frames (of N=16) can be e.g. cyclically accessed in to and out from the RSM blocks Assume a channel sample WL=32 bits per word (e.g. 16 bits I and 16 bits Q of a complex representation).

Due to POWER-OF-2 constrains in actual dual-sized RSM blocks, each RSM although requires only 32*M*N bits=32*5*16=2560 in our example, a RSM block 4096 bits need to be used for each RSM. The RSM arrangement is described in this case with 32*8=256 bits per written word, with 16 words per frame to be written into the RSM in a TDM fashion. The RSM is arranged such that every read word is of width 32 bits, and the RSM consists of 128 of such words.

It is noted that in order not to overlap read and write processes into same addresses, a larger RSM should be used. RSM read and write pointers need not work on same TDM frame (N=16) of samples, such as while one TDM frame is written the previous frame is read. This means that a cyclic or Ping-Pong buffer can be used inherently within the RSM addressing, given a larger RSM is used. For example a write process first access addresses 1 to 16 (so called page 1) and then access addresses 17 to 32 (so called page 2). And then wrap around writing into page 1. The read will first access page 2, but in out of order fashion offset as described before, then will read from page 1, etc.

The routing procedure can be summarized in an example, such—

RSM(j) write side:
 a. RSM(j) 'data_in' word size is 32 bit×5=160 bit (actually 256 bits RSM word size)

b. 16 address. WriteAddr size=4 bit.

c. RSM(j) sizing: 16×256

Write is done in order. According to the TDM Counter 4 bits.

RSM(j) read:

a. RSM(j) 'data_out' word size is 32 bit b. 16×8=128 address. ReadAddr size=7 bit.

c. RSM(j) sizing: 128×32

Read is done out of order. ReadAddr=[originated TDM slot (4 bits), Group_i select (3 bits)].

"ZERO" select: the router core should support "zero" input to the DUC at certain TDM slots. The write process uses only 160 bits out of the 256 bits word length. This means that choosing read address with 'Group_i select'=7 (or 5,6) the output will be '0'. RSM (the data RSMs) must then be initiated with all "ZEROS" before run time operation.

Figure 3:
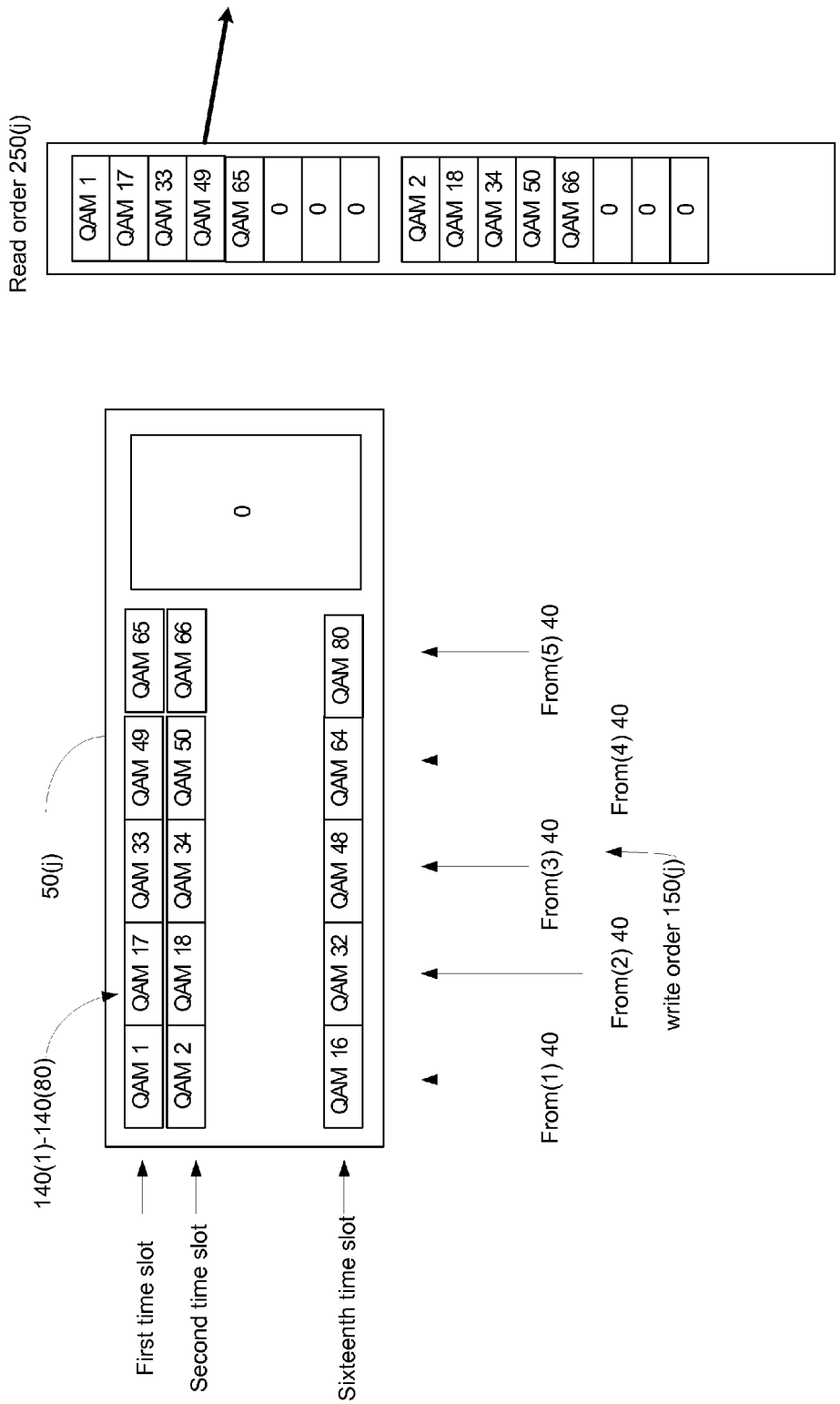
FIG. 3 illustrates data structures according to an embodiment of the invention.

FIG. 3 illustrates an example of eighty QAM samples 140(1)-140(80) of eighty QAM channels stored in RSM(j). The eighty QAM samples are generated by five (M=5) QAM generators 40(1)-40(5) in a 16 time slot TDM scheme. The eighty QAM samples are arranged in a matrix (representing a write order 150(j)) of five columns (one column per each QAM generator) and of sixteen row—each row corresponds to TDM timeslot of the sixteen TDM time slots. The RSM also stores coefficients such as zero.

All RSMs 50(1)-50(J) are fed with the same QAM samples in parallel.

Each RSM can be read according to a read order (referred to 250(j)) in which each QAM sample can be independently fetched and provided to the j'th input 70(j) of DUC 70. If J=12 then during each TDM time slot twelve QAM samples from twelve RSMs are read in parallel to be provided to the twelve inputs of DUC 70.

The configuration commands for RAMs can be stored in a memory. The commands are sent to the router core in a TDM fashion.

In one embodiment the configuration words can be stored in a dual-sized RAM with direct write addressing from host processor interface. Due to POWER-OF-2 constrains in actual dual-sized RAM blocks, the configuration RAM although requires only 1344 bits in our example, a RAM block 2048 bits need to be used.

Although the basic configuration word is 7 bits, in order to ease the host and user router configuration, the RAM is arranged in 8 bits words. The write process enters (writes) 7 bits into an 8 bits word. The read process which is clocked at the datapath frequency should read 7×12=84 bits per clock. This is done by reading 8×12=96 bits and dropping the stuffing bits.

Figure 4:
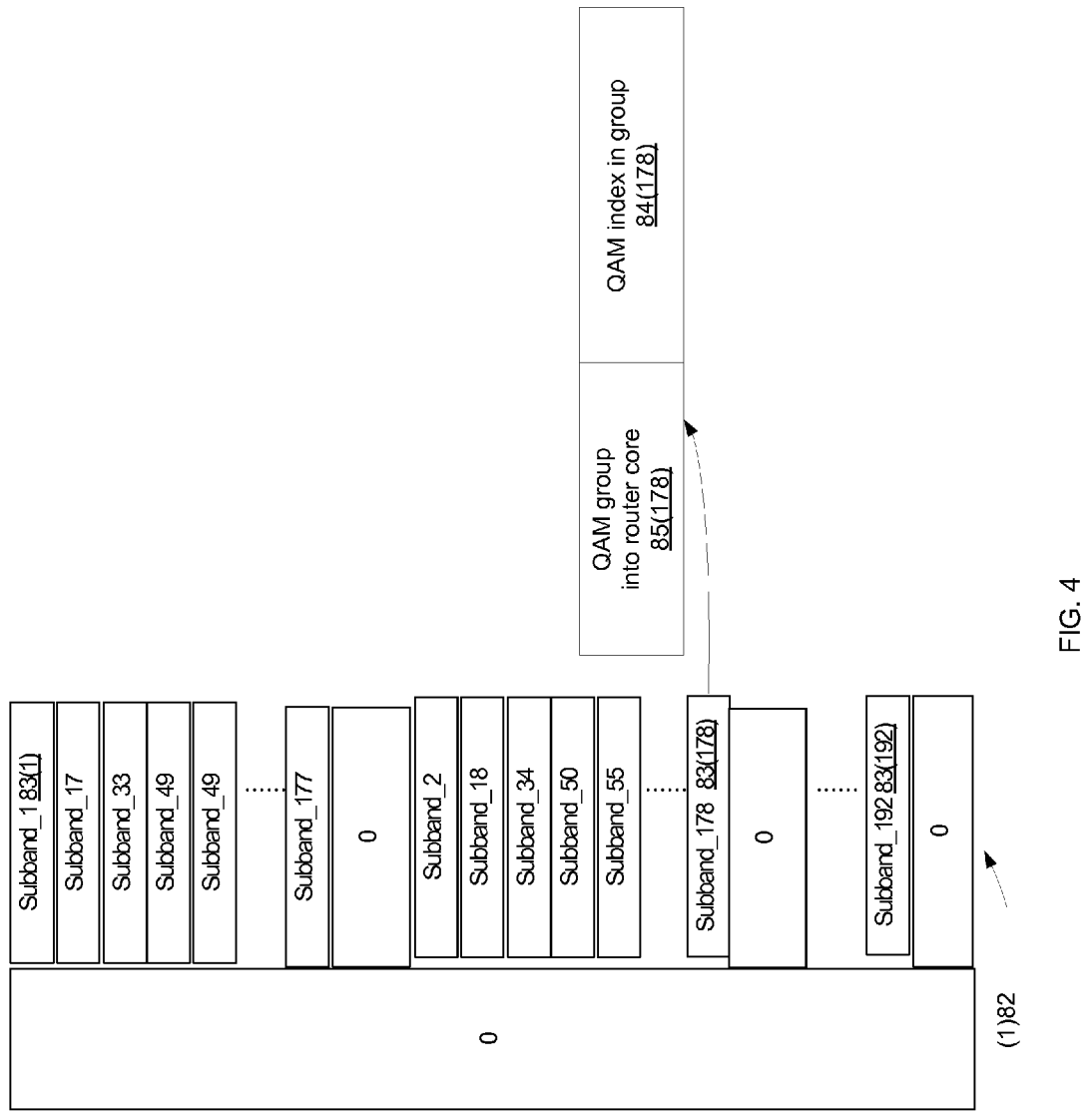
FIG. 4 illustrates data structures according to an embodiment of the invention.
Figure 5:
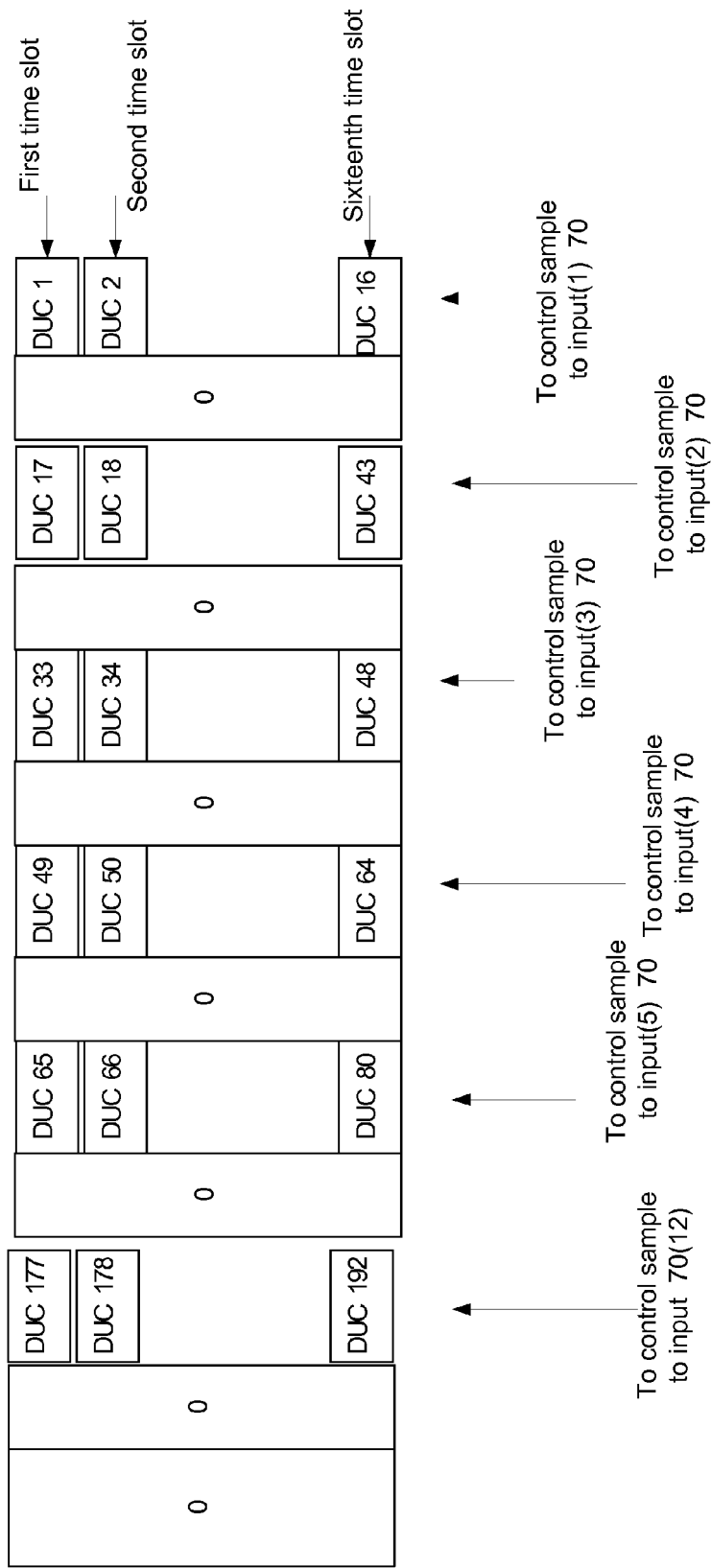
FIG. 5 illustrates data structures according to an embodiment of the invention.

FIGS. 4 and 5 illustrate the content of configuration memory 82 according to an embodiment of the invention. FIG. 4 illustrates the write order 82(1) of the control units 83(1)-83(K), K representing the number of sub-bands within the DUC frequency range. FIGS. 4 and 5 illustrate K=192.

FIG. 4 illustrates 192 sub-band control words Subband_1-Subband_192 83(1)-83(192), each determining the QAM sample channel to be fed to the frequency sub-band associated with the control signal. The control signal may have a most significant field (for example 85(178)) for selecting the QAM generator (also referred to as QAM group) and a least significant field (for example 84(178)) for selecting the QAM channel out of the 16 QAM channels generated by that QAM generator. Other arrangements of mapping fields can be provided.

The configuration memory 82 also stores coefficients such as zero.

FIG. 5 illustrates the read order—it includes a matrix of one hundred and ninety two control words Subband_1-Subband_192 83(1)-83(192)—each one indicating a QAM channel to be allocated to a unique sub-band of the 192 sub-bands. The matrix includes zero padding (the control word are 7 bits long and may require a single zero padded bit). The matrix includes sixteen rows—one for each time slot out of sixteen TDM time slots, and twelve columns—one for each of the twelve (J=12) inputs of DUC 70.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A device comprising:

a router;

wherein the router comprises multiple router inputs, multiple router outputs and a routing circuit coupled between the multiple router inputs and the multiple router outputs;

wherein the multiple router outputs are coupled to multiple digital up converter (DUC) inputs; wherein the different DUC inputs are associated with different frequency ranges;

wherein the multiple router inputs are coupled to multiple narrowband generators;

wherein the narrowband generators are arranged to generate samples of narrowband channels; and wherein the routing circuit comprises a re-sequencing memory module that is arranged to receive the samples of narrowband channels from the narrowband generator according to an input order and to output the samples of the narrowband channels to the multiple router outputs according to an output order that is responsive to an allocation of frequencies to the samples of the narrowband channels.

2. The device according to claim 1 further comprising the DUC.

3. The device according to claim 1 further comprising the narrowband generators.

4. The device according to claim 1 wherein an order of provision of samples of narrowband samples to each DUC input of the multiple DUC inputs determines an allocation of frequencies by the DUC to the samples of the narrowband channels within a frequency range associated with the DUC input.

5. The device according to claim 1 wherein the re-sequence memory module is coupled in parallel to all the multiple router inputs thereby facilitating a concurrent provision of samples of the narrowband channels to the multiple router inputs.

6. The device according to claim 1 wherein the multiple DUC inputs comprise a first number (J) of DUC inputs; and wherein the re-sequencing memory module comprises a first number (J) of memory sub-modules, each memory sub-module comprises a dual-port memory module.

7. The device according to claim 1 wherein the multiple DUC inputs comprise a first number (J) of DUC inputs; wherein each router output is coupled to a first multiplexer output; wherein each first multiplexer has a second number (M) of first multiplexer inputs; wherein each first multiplexer input is coupled to a re-sequencing memory module.

8. The device according to claim 1 wherein each narrowband generator is arranged to output an input time division multiplex of samples of different narrowband channels; and wherein each DUC input is arranged to receive an output time division multiplex of samples.

9. The device according to claim 1 wherein the narrowband generators are quadrature amplitude modulation (QAM) modulators.

10. The device according to claim 1, wherein the multiple narrowband generators comprise a plurality (M) of narrowband generators, each is arranged to output multiple (N) narrow band channels, wherein the DUC comprises multiple (J) inputs, wherein the re-sequence memory module comprises M groups of J re-sequencing units, wherein each narrowband generator is coupled in parallel to J re-sequencing units, wherein one re-sequencing unit for each of the M groups of the J re-sequencing units are coupled to multiple inputs of one multiplexer out of J multiplexers, wherein J outputs of the J multiplexers are coupled to the J inputs of the DUC.

11. The device according to claim 10 wherein each narrowband generator is arranged to output samples of the N narrowband channels in a time division multiplexing (TDM) manner.

12. The device according to claim 10 further comprising a read/write circuit that is arranged to send control signals that determine the mapping between narrowband samples and sub-bands to the M groups of J re-sequencing units and to the J multiplexers.

13. The device according to claim 1, wherein the multiple narrowband generators comprises a plurality (M) of narrowband generators, each is arranged to output multiple (N) narrow band channels, wherein the DUC comprises multiple (J) inputs, wherein the re-sequence memory module comprises J re-sequencing units, wherein each narrowband generator is coupled in parallel to each one of the J re-sequencing units, wherein each of the J re-sequencing units is coupled to a unique input of the DUC.

14. The device according to claim 13 wherein each narrowband generator is arranged to output samples of the N narrowband channels in a time division multiplexing (TDM) manner.

15. The device according to claim 13 further comprising a read/write circuit that is arranged to send control signals that determine the mapping between narrowband samples and sub-bands to the J re-sequencing units and to the J multiplexers.

* * * * *